United States Patent [19]

Rea

[11] 4,234,325
[45] Nov. 18, 1980

[54] SILENCER-SEPARATOR WITH INTERNAL TRAP FOR LIQUID SEAL BLOWERS OR THE LIKE

[75] Inventor: Wayne E. Rea, Connersville, Ind.

[73] Assignee: Dresser Industries, Inc., Dallas, Tex.

[21] Appl. No.: 21,389

[22] Filed: Mar. 19, 1979

[51] Int. Cl.³ ............................................. B01D 19/00
[52] U.S. Cl. ........................................ 55/185; 55/218; 55/276; 55/319
[58] Field of Search .................. 55/57, 218, 276, 174, 55/185, 319, 437, 472, 473; 417/69

[56] References Cited

U.S. PATENT DOCUMENTS

| | | | |
|---|---|---|---|
| 2,362,954 | 11/1944 | Adams | 417/69 |
| 3,228,174 | 1/1966 | Perry, Jr. | 55/185 X |
| 4,035,171 | 7/1977 | Reed et al. | 55/319 |

Primary Examiner—Charles N. Hart
Assistant Examiner—Richard W. Burks
Attorney, Agent, or Firm—John N. Hazelwood; Roy L. Van Winkle

[57] ABSTRACT

The silencer-separator described hereinafter includes a tank that has an inlet arranged to receive the discharge from a vacuum blower or the like, a discharge located at the opposite end of the tank, a partition located therebetween with hole extending therethrough to permit the gas to flow from the discharge of the blower to the discharge of the tank. At the lowermost end of the tank, there is provided a drain for the liquid that is separated as the air enters the tank from the blower. An overflow conduit extends from adjacent the lowermost portion of the tank, through the partition and is connected with the liquid drain. With the conduit arranged in this manner, water, which is used to seal the blower, is located in the conduit preventing sound, generated as the gas is discharged from the blower, from passing through the conduit to the atmosphere via the drain.

2 Claims, 2 Drawing Figures

SILENCER-SEPARATOR WITH INTERNAL TRAP FOR LIQUID SEAL BLOWERS OR THE LIKE

BACKGROUND OF THE INVENTION

This invention relates to an improved silencer-separator for use with water sealed blowers or the like. More particularly, but not by way of limitation, this invention relates to an improved silencer-separator that utilizes the sealing water discharged from the blower to prevent the sound generated by the blower discharge from passing to the atmosphere through the drain.

Insofar as applicant is aware, silencer-separators constructed in the past had a drain pipe or the like connected to the lowermost portion thereof extending externally therefrom into a water drain. The water drain and drain pipe arrangement assured complete drainage of the tank to prevent freezing and included a trap into which the drain pipe extended to prevent the escape of sound from the tank directly to the atmosphere.

An object of this invention is to provide an improved silencer-separator that is self-contained, effectively separates water from the gas and reduces blower discharge noise, and yet one that will drain to prevent freezing of the liquid when the blower is stopped.

SUMMARY OF THE INVENTION

This invention provides an improved silencer-separator for a liquid-sealed gas blower or the like that includes a discharge and that is provided with water injection means. The silencer-separated includes a hollow tank that has an inlet in communication with the blower discharge and a gas outlet and liquid drain located near the lowermost portion of the tank. The tank has at least one partition located therein between the inlet and outlet dividing the tank into a first chamber including the inlet and succeeding chambers including the outlet. A gas passageway is located in the partition above the anticipated water level in the tank and an overflow conduit extends through the partition. The overflow conduit has an entry end located in the first chamber adjacent to the lower portion of the tank and below the water level when the blower is operating. The outlet end of the overflow conduit is connected with the liquid drain.

BRIEF DESCRIPTION OF THE DRAWING

The foregoing additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
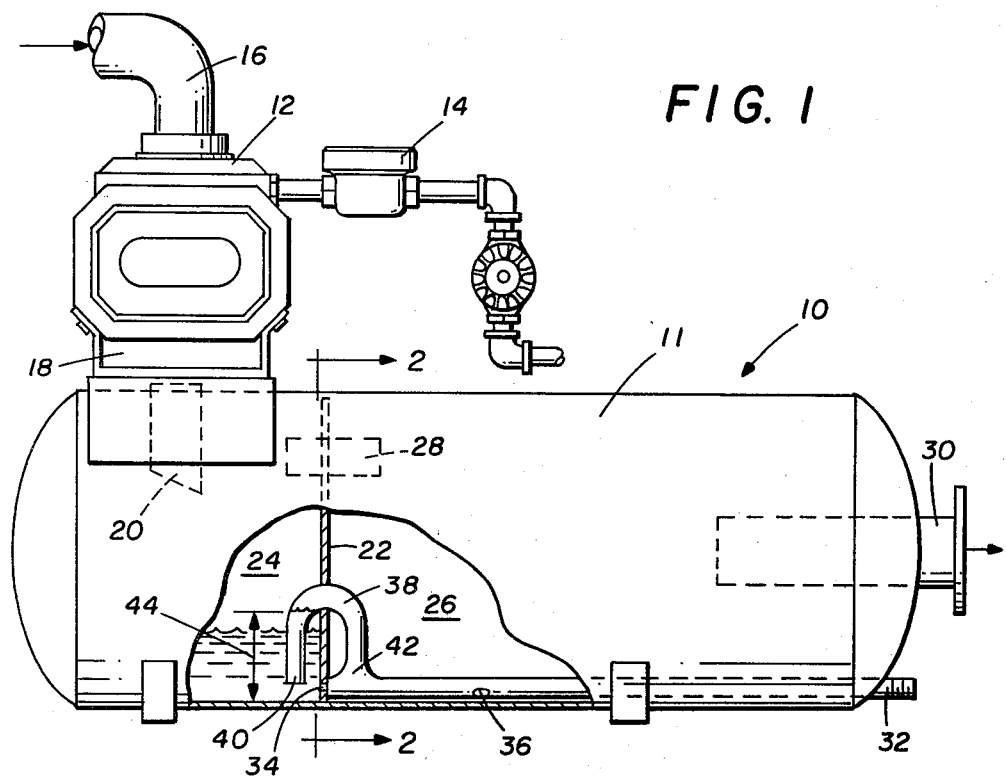
FIG. 1 is a view partly in elevation and partly in cross-section of a silencer-separator that is constructed in accordance with the invention.

Referring to the drawing and to FIG. 1 in particular, shown therein and generally designated by the reference character 10 is a silencer-separator constructed in accordance with the invention. The silencer-separator 10 includes a tank 11 having a vacuum blower 12 mounted thereon that includes water injection apparatus 14 for introducing water into the blower 12 for sealing the blower as is well known in the art.

The blower 12 is, of course, driven by an electric motor or gas engine, or the like (now shown). The blower 12 has an inlet 16 that is connected with a vacuum system (not shown) and a discharge 18 that is connected with an inlet 20 of the tank 11.

Figure 2:
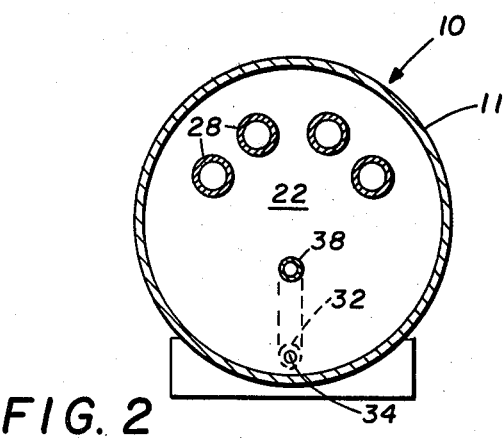
FIG. 2 is a cross-sectional view taken substantially along the line 2—2 of FIG. 1.

A partition 22 is disposed in the tank 11 dividing the tank into a first chamber 24 and a second chamber 26. Gas entering the first chamber 24 via the inlet 20 of the tank 11 can pass through the partition 22 into the chamber 26 via a plurality of gas conduits or openings 28 that may be seen more clearly in FIG. 2. The tank 11 is provided with a gas discharge 30 from which the gas may be discharged to the atmosphere or if desired may be passed through additional manifolding, mufflers, etc.

As the gas enters the first chamber 24, liquid, that is, water, which is injected in the blower 12 for sealing purposes, is separated from the gases and migrates to the lower portion of the tank 11 as illustrated most clearly in FIG. 1. In order to rid the tank 11 of the water, the tank is provided with a discharge conduit 32 that extends along the lowermost portion of the tank 11 and is welded or otherwise affixed to the partition 22. A drain passageway 34 extends through the partition 22 into fluid communication with the end of the discharge conduit 32 that is connected with the partition 22. The passageway 34 is sized so that the least amount of water anticipated to be received in the chamber 24 cannot be discharged through the discharge conduit 32 as rapidly as it enters the tank 11 for purposes that will become more apparent hereinafter. The discharge conduit 32 is also provided with a small hole 36 that is located in the second chamber 26 so that condensate or the small amount of the sealing water that may enter the second chamber 26 will have an access into the discharge conduit 32.

As may be seen more clearly in FIG. 1, an overflow conduit 38 which appears to be an inverted U-shaped member, extends through the partition 22 and has a first or entry end 40 located in the chamber 24 slightly above the lowermost portion of the tank 11. A second end 42 of the overflow conduit 38 is connected with the discharge conduit 32 and is therefore in communication with both the passageway 34 and discharge conduit 32.

It will be noted that the location of the lowermost portion of the overflow conduit 38 where it extends through the partition 22 is at a height 44 above the lowermost portion of the entry end 40. The height 44 is greater than the differential in pressure, expressed in inches of water, between the chamber 24 and atmosphere. (For example, a silencer-separator with 5-inch air connections, a 1½ inch water drain connection, air flow of 300 cfm, water flow of 3½ gpm, a trap height of 7 inches and a drain orifice of ½ inch diameter will have 1.3 inches of water column air pressure in the first chamber because of pressure drop and will accumulate water to a height of 5.7 inches above the bottom of the trap inlet. The approximate water flow through the orifice is 2½ gpm and the overflow from the trap is 1 gpm. Any water flow in excess of 3½ gpm from the vacuum blower, or its process, will pass through the drain trap overflow in addition to the 1 gpm normal flow. At other air pressures in the first chamber, the water level in this chamber will fluctuate; however, the flow through the orifice will remain substantially constant at approximately 2½ gpm.)

OPERATION OF THE PREFERRED EMBODIMENT

When the blower 12 is operating, water is injected by the system 14 into the blower 12 providing a seal therein, as is well known by those skilled in the art, and gas is drawn from the inlet 16 into the blower 12 and discharged therefrom through the outlet 18 into the inlet 20 of the silencer-separator 10. As evident from FIG. 1, gas discharged from the inlet 20 changes directions and expands in the chamber 24, then passes through the conduits 28 into the second chamber 26. Such change in direction causes the separation of the liquid from the gas and the expansion and change of direction of the gas course attenuates the sounds generated as the gas is discharged from the blower 12.

The water separated from the gas collects at the lowermost portion of the tank 11 in the chamber 24 and a small portion thereof passes through the discharge passageway 34 into the discharge conduit 32. From there, the water is either discharged into a drain or recirculated for reuse as sealing water.

Since the passageway 34 has been sized so that the water being separated cannot pass through the passageway 34 as fast as it is discharged into the chamber 24, the level rises therein. If the liquid level plus internal pressure exceeds the height 44, the liquid flows through the overflow conduit 38 into the discharge conduit 32. However, the height 44, as selected, is sufficiently high so that once the water level drops near the entry end 40 of the conduit 38, the differential in pressure in the chamber 24 as compared to atmosphere, will not be sufficient to cause the liquid to continue its flow through the conduit 38. Thus, the discharge conduit 32 will be sealed with water at both entrances 40 and 34, and effectively block any sound that might otherwise be transferred therethrough from the chamber 24.

It is also important to note that when the blower 12 is shut down, that is, when it stops running, the passageway 34 permits the water in the chamber 24 to drain through the discharge conduit 32, preventing any damage that might result to the tank 11 if the water should freeze therein.

It will be appreciated that even though the device described hereinbefore is relatively simple in construction, that it will be effective in both separating the sealing water from the discharge gas as well as attenuating the noise levels that are generated by the blower discharge and preventing such sounds from being transferred through the water discharge system. Forthermore, and as previously pointed out, the system is self-contained and cannot be damaged by freezing.

Having described but a single embodiment of the invention, it will be understood that such embodiment is presented by way of example only, and that many changes and modifications can be made thereto without departing from the spirit of the invention.

The embodiments of the invention in which an exclusive property or privilege is claimed are defined as follows:

1. An improved silencer-separator for liquid-sealed gas blowers or the like including a discharge and being provided with water injection means, said silencer-separator including:
    a hollow tank having an inlet in communication with the blower discharge, a gas outlet and a liquid drain near the lowermost portion of the tank;
    a partition between said inlet and outlet dividing said tank into a first chamber including the inlet and a second chamber including the outlet and the drain;
    a gas passageway in said partition located above the anticipated water level in the tank;
    an overflow conduit extending through said partition and having an entry end located in the first chamber adjacent the lower portion of the tank and below the water level when the blower is operating and having an outlet end, connected with said liquid drain; and,
    wherein said overflow conduit extends through said partition at a height measured from the lowermost portion of the entry end of the overflow conduit that is greater than the anticipated maximum pressure differential expressed in inches of water between said first chamber and atmospheric pressure.

2. An improved silencer-separator for liquid-sealed gas blowers or the like including a discharge and being provided with water injection means, said silencer-separator including:
    a hollow tank having an inlet in communication with the blower discharge, a gas outlet and a liquid drain near the lowermost portion of the tank;
    a partition between said inlet and outlet dividing said tank into a first chamber including the inlet and a second chamber including the outlet and the drain;
    a gas passageway in said partition located above the anticipated water level in the tank;
    an overflow conduit extending through said partition and having an entry end located in the first chamber adjacent the lower portion of the tank and below the water level when the blower is operating and having an outlet end, connected with said liquid drain;
    wherein said overflow conduit extends through said partition at a height measured from the lowermost portion of the entry end of the overflow conduit that is greater than the anticipated maximum pressure differential expressed in inches of water between said first chamber and atmospheric pressure;
    a drain passageway in said partition located adjacent the lowermost portion of said tank in communication with the liquid drain, said drain passageway being too small to permit full flow of the minimum sealing water injected into the blower; and,
    wherein said drain passageway is also connected with said overflow conduit.

* * * * *